US011677255B1

United States Patent
Li et al.

(10) Patent No.: US 11,677,255 B1
(45) Date of Patent: Jun. 13, 2023

(54) FREQUENCY MANAGEMENT FOR WIRELESS POWER TRANSFER

(71) Applicant: Apple Inc., Cupertino, CA (US)

(72) Inventors: Ye Li, Sunnyvale, CA (US); Antoin J. Russell, Mountain View, CA (US); Stephen C. Terry, San Jose, CA (US); Adam L. Schwartz, Redwood City, CA (US); Sumant Ranganathan, Saratoga, CA (US); Gianpaolo Lisi, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/644,005

(22) Filed: Dec. 13, 2021

Related U.S. Application Data (60) Provisional application No. 63/261,541, filed on Sep. 23, 2021.

(51) Int. Cl.
*H02J 7/00* (2006.01)
*H02J 50/70* (2016.01)
*H02J 50/80* (2016.01)
*H02J 50/12* (2016.01)

(52) U.S. Cl.
CPC .......... *H02J 7/00711* (2020.01); *H02J 50/12* (2016.02); *H02J 50/70* (2016.02); *H02J 50/80* (2016.02)

(58) Field of Classification Search
CPC ........ H02J 7/00711; H02J 50/12; H02J 50/70; H02J 50/80
See application file for complete search history.

(56) References Cited

U.S. PATENT DOCUMENTS

| | | | |
|---|---|---|---|
| 10,637,294 B2* | 4/2020 | Sarwat | H02J 50/12 |
| 2011/0181119 A1* | 7/2011 | Ishibashi | H02J 50/12 307/104 |
| 2012/0056485 A1* | 3/2012 | Haruyama | H02J 50/80 307/104 |

(Continued)

FOREIGN PATENT DOCUMENTS

KR      20200077082 A      6/2020

OTHER PUBLICATIONS

U.S. Appl. No. 17/386,542, filed Jul. 28, 2021, Nussbaum et al.
U.S. Appl. No. 63/216,831, filed Jun. 30, 2021, Li et al.

*Primary Examiner* — Jared Fureman
*Assistant Examiner* — Michael J Warmflash
(74) *Attorney, Agent, or Firm* — Fletcher Yoder PC (57) ABSTRACT

A wireless power transmitter can include a coil, an inverter coupled to the coil, and control circuitry coupled to the inverter that, responsive to receiving a burst request pulse from a wireless power receiver, initiates inverter operation, driving the coil and powering the receiver. The control circuitry can operate inverter switches so bandwidth of the wireless power transfer signal falls within a specified range by: (a) extending a minimum on time of the switches, (b) modifying pulse width modulation (PWM) drive signals supplied to the switches to shape a coil current burst envelope, and/or (c) modifying PWM signal amplitude supplied to the switches. Modifying the PWM drive signals can include using a symmetrical PWM scheme in which the positive and negative pulses are symmetrical in width on a cycle-by-cycle basis or using a complementary PWM scheme in which the positive and negative pulse widths are complementary on a cycle-by-cycle basis.

13 Claims, 5 Drawing Sheets

(56) References Cited

U.S. PATENT DOCUMENTS

| | | | |
|---|---|---|---|
| 2013/0099585 A1* | 4/2013 | Von Novak | H02J 50/12 |
| | | | 307/104 |
| 2014/0346887 A1* | 11/2014 | Bhamidipati | H02J 50/12 |
| | | | 307/104 |
| 2017/0240056 A1* | 8/2017 | Elshaer | H02J 50/12 |
| 2017/0281944 A1* | 10/2017 | Khalil | A61N 1/3787 |
| 2018/0294674 A1* | 10/2018 | Choi | H02M 3/01 |
| 2019/0022394 A1* | 1/2019 | Fayram | A61N 1/36062 |
| 2019/0089171 A1* | 3/2019 | Fischer | H02J 7/0013 |
| 2021/0091591 A1* | 3/2021 | Brelivet | H02J 50/12 |
| 2021/0194289 A1* | 6/2021 | Schulzetenberg | |
| | | | A61N 1/37223 |

* cited by examiner

FREQUENCY MANAGEMENT FOR WIRELESS POWER TRANSFER

CROSS-REFERENCE TO RELATED APPLICATIONS

This application claims priority to U.S. Provisional Application Ser. No. 63/261,541, filed Sep. 23, 2021, entitled "Occupied Bandwidth Reduction for Wireless Power Transmitters," the disclosure of which is incorporated by reference in its entirety for all purposes.

BACKGROUND

Wireless power transfer, in which power is delivered via magnetic/inductive coupling between a power transmitter (PTx) and a power receiver (PRx), is useful for powering battery powered electronic devices. In some applications, burst mode wireless power transfer may be provided to enhance operating efficiency. Bursty operation of wireless power transmitters may result in undesired electromagnetic emissions.

SUMMARY

A wireless power transmitter can include a wireless power transfer coil, an inverter coupled to the wireless power transfer coil, and control circuitry coupled to the inverter that, responsive to receiving a burst request pulse from a wireless power receiver, initiates operation of the inverter to drive the wireless power transfer coil, thereby delivering power to the wireless power receiver. The control circuitry can operate one or more switching devices of the inverter to deliver power to the wireless power receiver such that a bandwidth of the wireless power transfer signal falls within a specified bandwidth range. The control circuitry can operate one or more switching devices of the inverter to deliver power to the wireless power receiver such that a bandwidth of the wireless power transfer signal falls within the specified bandwidth range by extending a minimum on time of the switches. The control circuitry can operate one or more switching devices of the inverter to deliver power to the wireless power receiver such that the bandwidth of the wireless power transfer signal falls within the specified bandwidth range by modifying drive signals supplied to the switching devices to shape a coil current burst envelope. The control circuitry can modify the drive signals supplied to the switching devices to shape the coil current burst envelope using a symmetrical pulse width modulation switching scheme in which the inverter-generated positive and negative pulses are symmetrical in width on a cycle-by-cycle basis. The control circuitry can modify the drive signals supplied to the switching devices to shape the coil current burst envelope using a complementary pulse width modulation switching scheme in which the inverter-generated positive and negative pulse widths are complementary on a cycle-by-cycle basis. The control circuitry can operate one or more switching devices of the inverter to deliver power to the wireless power receiver such that the bandwidth of the wireless power transfer signal falls within the specified bandwidth range by modifying an amplitude of pulse width modulation signals supplied to the switching devices.

A method of operating a wireless power transmitter in a burst mode can include receiving a burst request pulse from a wireless power receiver; responsive to the burst request pulse, operating one or more switching devices of the transmitter during an on time; and subsequent to the on time, idling the one or more switching devices during an off time. Operating one or more switching devices of the transmitter during an on time can include operating the one or more switching devices to constrain electromagnetic emissions from the wireless power transmitter within a specified bandwidth range. Operating the one or more switching devices to constrain electromagnetic emissions from the wireless power transmitter within the specified bandwidth range can include extending the on time. Operating the one or more switching devices to constrain electromagnetic emissions from the wireless power transmitter within the specified bandwidth range can include modifying drive signals supplied to the switching devices to shape a coil current burst envelope. Modifying the drive signals supplied to the switching devices to shape the coil current burst envelope can include using a symmetrical pulse width modulation switching scheme in which the inverter-generated positive and negative pulses are symmetrical in width on a cycle-by-cycle basis. Modifying the drive signals supplied to the switching devices to shape the coil current burst envelope comprises using a complementary pulse width modulation switching scheme in which the inverter-generated positive and negative pulse widths are complementary on a cycle-by-cycle basis. Modifying the drive signals supplied to the switching devices to shape a coil current burst envelope can include modifying an amplitude of pulse width modulation signals supplied to the switching devices.

A wireless power transmitter can include a wireless power transfer coil, an inverter comprising a plurality of switching devices coupled to the wireless power transfer coil, and control circuitry that provides drive signals to the plurality of switching devices. The drive signals can be controlled such that the frequency bandwidth of the wireless power transfer signal falls within a predetermined range. The control circuitry can extend a minimum on time during which the plurality of switching devices are operated such that the frequency bandwidth of the wireless power transfer signal falls within the predetermined range. The control circuitry can employ a symmetrical pulse width modulation scheme to shape a burst current envelope such that the frequency bandwidth of the wireless power transfer signal falls within the predetermined range. The symmetrical pulse width modulation scheme can include generating positive and negative pulses that are symmetrical in width on a cycle-by-cycle basis. The control circuitry can employ a complementary pulse width modulation scheme to shape a burst current envelope such that the frequency bandwidth of the wireless power transfer signal falls within the predetermined range. The complementary pulse width modulation scheme can include generating positive and negative pulses having complementary widths on a cycle-by-cycle basis. The control circuitry can employ an amplitude modulation scheme to shape a burst current envelope such that the frequency bandwidth of the wireless power transfer signal falls within the predetermined range.

DETAILED DESCRIPTION

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different FIGS. to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given FIG. may be used to illustrate the features of more than one embodiment, or more than one species of the disclosure, and not all elements in the FIG. may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

Figure 1:
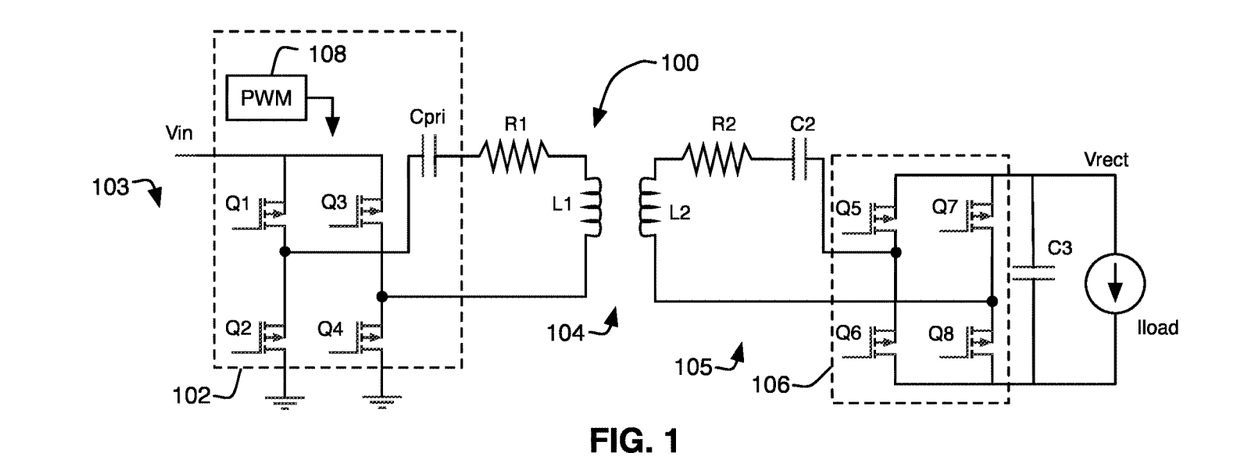
FIG. 1 illustrates a high level schematic of a wireless power transfer system.

FIG. 1 illustrates a high level schematic of a wireless power transfer system 100. The left side of the FIG. illustrates a power transmitter (PTx) 103, which receives an input voltage Vin and transmits energy to a receiver via magnetic induction, i.e., by coupling between transmit and receive coils represented by inductors L1 and L2, respectively. (Each coil/inductor also has a corresponding intrinsic/parasitic resistance: R1/R2. These are illustrated in the schematic of FIG. 1 but are not separate physical components.) The right side of the FIG. depicts a power receiver (PRx) 105 that receives power via the aforementioned inductive coupling and delivers power to a load depicted by current source Iload. An input voltage Vin is supplied to inverter 102. Inverter 102 generates an AC output having a predetermined frequency and a magnitude that is determined by input voltage Vin, which may be regulated by a separate regulator (not shown). This AC output voltage of inverter 102 is provided the transmit coil, represented by inductor L1, which is magnetically coupled a corresponding receive coil, represented by inductor L2. This results in energy transfer to the PRx 105. PRx 105 includes a receive coil, represented by inductor L2, which has a voltage induced therein by magnetic induction via transmit coil L1. This AC voltage may be provided to a rectifier 106, discussed in greater detail below, that converts the received AC voltage to an output DC voltage (Vrect) that may be supplied to a load. The wireless power transfer system 100 may include additional components, such as transmitter tuning capacitor Cpri and receiver tuning capacitor C2 that may be used to tune the resonant frequency of the transmit and receive circuits to improve operating efficiency of the system.

In the illustrated embodiment, inverter 102 is a full bridge inverter made up of four switching devices Q1-Q4, although other inverter topologies could be used as appropriate for a given application. Also depicted at a high level is PWM controller 108, which provides pulse width modulation signals to the switching devices Q1-Q4 to generate a desired output voltage and/or current. These switching devices are illustrated as MOSFETs (metal-oxide-semiconductor field effect transistors), though other types switching devices (including, for example, IGBTs (insulated gate bipolar transistors), junction field effect transistors (JFETs), etc. could be used as appropriate for a given embodiment. Likewise, any suitable semiconductor technology, such as silicon, silicon carbide (SiC), gallium nitride (GaN), could be used depending on the specific application. The same applies to all other switching devices (including diodes) discussed in the present application. Switching devices Q1-Q4 may be alternately switched to connect an input DC voltage (e.g., from boost regulator 108) to the transmit winding L1, producing an AC voltage that may be coupled to the PRx as described above.

Operation of inverter 102 will induce an AC voltage in magnetically coupled PRx receiver coil L2. This AC voltage may be coupled to a rectifier 106. In the illustrated embodiment, rectifier 106 is a full bridge active rectifier made up of four switches Q5-Q7. Although illustrated as MOSFET switches, other rectifier types, constructed using any suitable semiconductor technology, could also be used. These alternative configurations can provide for increased operating efficiency in some applications.

Operating a wireless power transfer system in a burst mode can address inefficiencies associated with at the system under certain loading conditions. In burst mode, power is transmitted in short bursts instead of continuously. Thus, a burst can include one or more AC pulses from the inverter. Following the one or more burst pulses, there may be an intervening time period during which no AC power is transmitted. This intervening time period may then be followed by another burst of one or more AC pulses. This can mitigate light load inefficiencies by decreasing switching losses and quiescent current losses. Additionally, carefully controlled use of burst mode can allow the system to effectively be loaded at its optimum output resistance, thus allowing the AC/AC system to be operated at or near its peak efficiency, regardless of actual output power. Finally, the use of burst mode can be used to control the voltage gain of the system, i.e., the ratio of the output voltage Vrect to the input voltage Vin.

Figure 2:
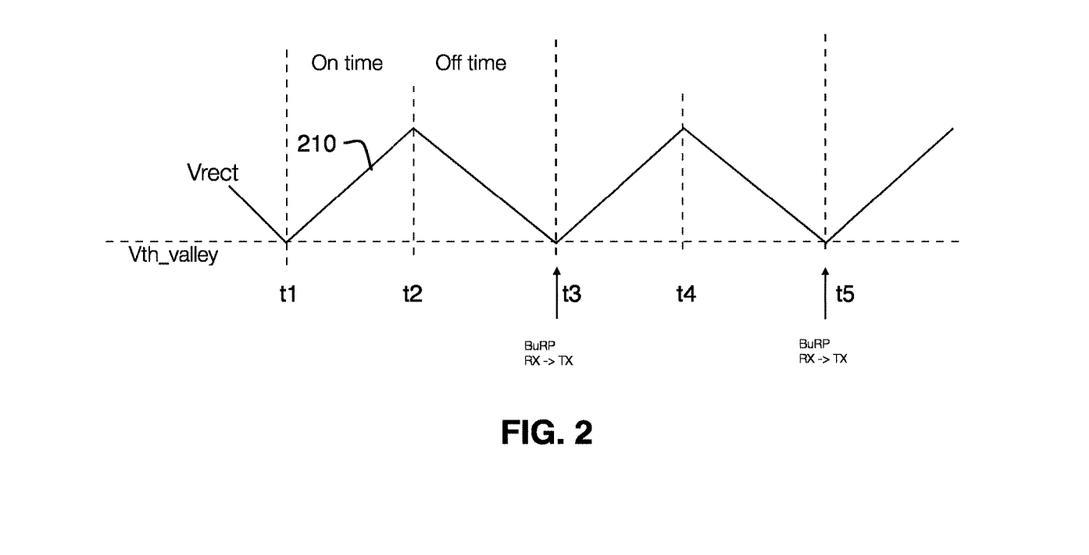
FIG. 2 illustrates burst mode operation of a WPT system, showing the rectifier output voltage.

FIG. 2 shows burst mode operation, with the switching on and off times and showing the rectifier output voltage 210. Beginning, for example, at time t1, an on time of the inverter may begin, triggered by a burst request pulse from the receiver. During this on time, switching on the inverter side may transfer power to the receiver side, causing the rectifier voltage Vrect to increase to a peak value at time t2, corresponding to when the burst is terminated, i.e., the inverter stops switching. Then, during the off time (from t2 to t3), when the inverter is not switching, the rectifier voltage Vrect may decrease to a valley threshold (Vth_valley) that causes the receiver to send another burst request pulse at time t3, repeating the cycle.

In a typical implementation of burst mode wireless power transfer, the power receiving device can communicate to the power transmitting device that power is required by initiating a burst request pulse. This pulse may be created by the receiver by using the rectifier switches to apply a predetermined switching pattern, sequence, or state to the receiver coil. This predetermined switching pattern, sequence, or state alters the reflected impedance magnetically coupled via the transmitter and receiver windings to the power transmitter/inverter. Upon detection of this pulse, the transmitter/inverter initiates a burst of pulses as described above. Exemplary implementations of burst mode control circuitry are disclosed in Applicant's co-pending U.S. Patent Applications Ser. No. 17/386,542, entitled "Efficient Wireless Power Transfer Control," filed Jul. 28, 2021 and 63/216,831, entitled "Wireless Power Transfer with Integrated Communications," filed Jun. 30, 2021, which are incorporated by reference in their entirety.

Figure 3:
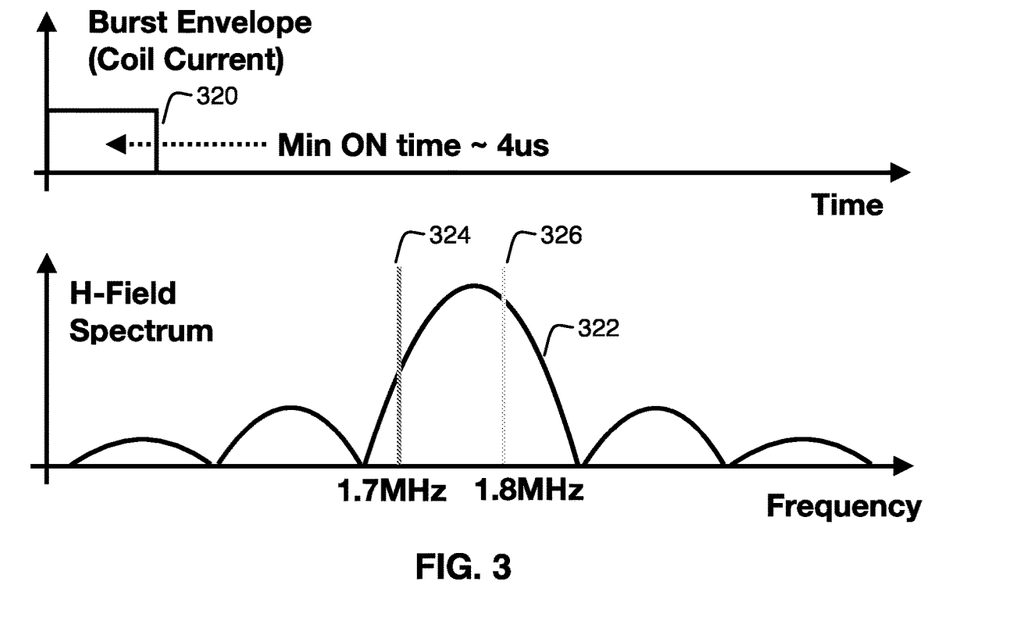
FIG. 3 illustrates an exemplary burst envelope and corresponding frequency spectrum.

Burst mode operation may be characterized in part by an on time, that is the duration during which the inverter in the power transmitter is switching to provide power to the receiver. There is also a corresponding off time during which the inverter in the power transmitter is not switching and no power is delivered to the receiver. In some embodiments, it may be desirable for a minimum duration of the on time to be relatively short. For example, this may provide for improved ripple performance with respect to the rectified DC voltage appearing at the receiver. The on time corresponds to a burst envelope, the envelope being defined in terms of the current delivered to the transmit coil being non-zero and in terms of the current over that interval. FIG. 3 illustrates an exemplary burst envelope 320. Burst envelope 320 may, for example, have a minimum duration of 4µs, although other minimum durations are possible.

The illustrated burst envelope 320 results in an H-field spectrum 322, also depicted in FIG. 3. The H-field generated by the device is a function of the current delivered to the transmit coil during the burst on time, i.e., when the inverter is switching. In the illustrated example, it may be desirable for a certain percentage of the total H-field energy to occupy the bandwidth between a lower frequency limit 324 and an upper frequency limit 326. In the illustrated example, the lower frequency limit may be 1.7 MHz, and the upper frequency limit may be 1.8 MHz, although other values are also possible. It may be beneficial for the emissions energy associated with operation of the wireless power transmitter, including burst mode operation, to fall within a certain band, i.e., between the lower and upper limits. Spectrum 322, shown in FIG. 3, illustrates an exemplary burst envelope 320 whether a relatively larger amount of emission energy falls outside the 1.7 to 1.8 MHz band.

Figure 4:
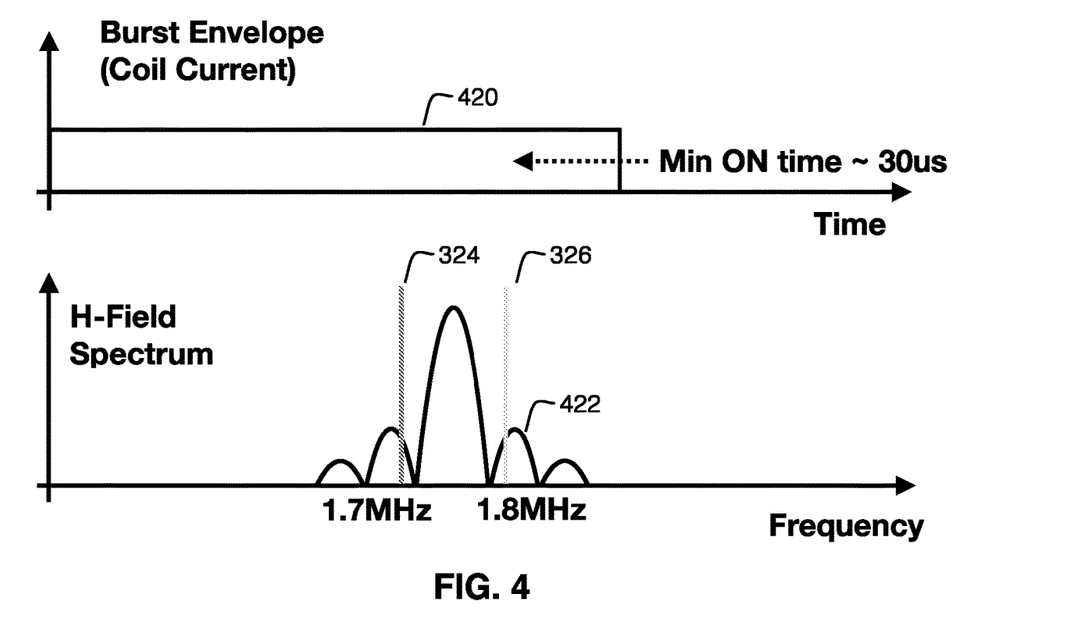
FIG. 4 illustrates an exemplary improved burst envelope and corresponding frequency spectrum.

One way in which the burst mode operation may be modified to focus is the emission band is to extend the minimum on time associated with burst mode operation. FIG. 4 illustrates such an arrangement. In FIG. 4, the minimum on time of the burst mode can be extended so as to be approximately 30µs, roughly 8× longer than in FIG. 3. This corresponds to the lengthened burst envelope 420. Lengthened burst envelope 420 can correspond to an H-field spectrum 422. As illustrated in the frequency domain plot in the lower portion of FIG. 4, more of the energy associated with the time-lengthened burst envelope falls in the band between lower frequency limit 424 and upper frequency limit 426. Increasing the minimum on time may, in some applications, lead to increased ripple voltage of the Vrect voltage appearing at the output of the rectifier in the power receiver. To some degree this ripple may be mitigated, e.g., by larger output capacitors or other techniques. However, in some of these applications, it may not be feasible to tolerate higher ripple or to otherwise mitigate the ripple voltage.

Figure 5:
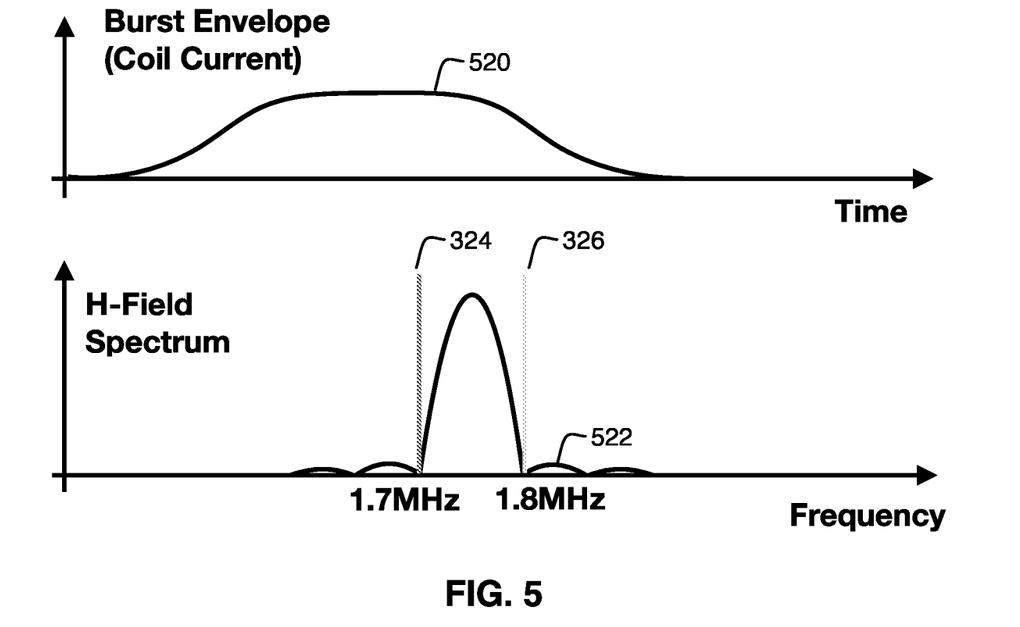
FIG. 5 illustrates an exemplary burst envelope with further improved performance.

An additional or alternative approach that may be employed is to modify switching of the inverter to shape the vertical profile of the burst envelope. This corresponds to changing the rate at which the transmit coil current increases at the beginning of the burst period and/or decreases at the end of the burst period. Such an example is illustrated in FIG. 5. In FIG. 5, burst envelope 520 has been extended in time as compared to burst envelope 320 of FIG. 3. Additionally, the burst envelope has been shaped so that the coil current (and correspondingly the power transmitted) ramps up gradually at the beginning of the burst envelope and ramps down gradually at the end of the burst envelope, rather than being a sharp on/off transition as depicted above in the burst envelopes 320 (FIGS. 3) and 420 (FIG. 4). Spectrum 522 depicts the effect of such envelope shaping on the H-field spectrum. As a result of the envelope shaping, significantly more of the H-field energy is contained in the bandwidth between lower frequency limit 324 and upper frequency limit 326.

Figure 6:
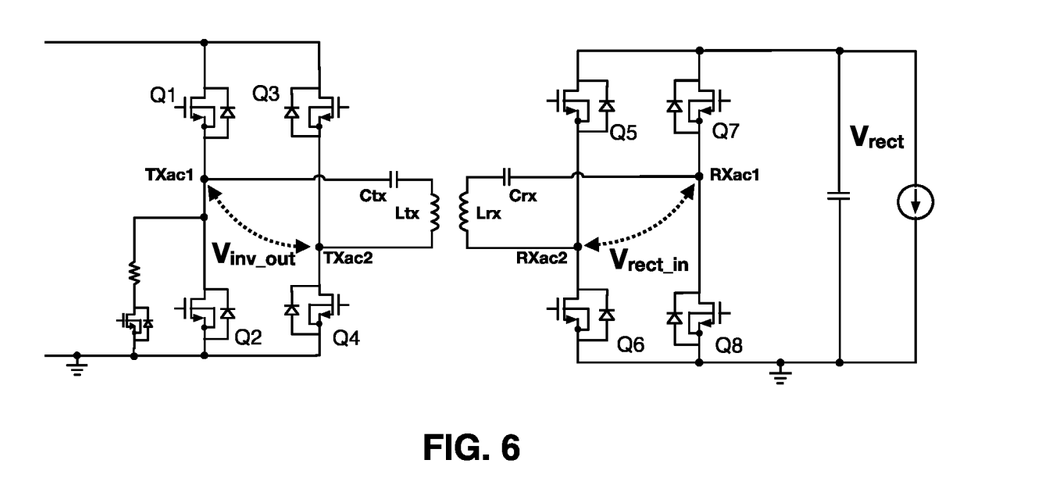
FIG. 6 illustrates a high level schematic of an exemplary wireless power transfer system.

Such envelope shaping may be achieved by specific control of the inverter switching devices described in greater detail below. FIG. 6 depicts a simplified schematic of the wireless power transfer system that identifies voltages and terminals relevant to the discussion. The techniques described below may also be employed in systems having differing circuit configurations or topologies than those described herein, which are merely exemplary. The transmitter inverter is made up of four switching devices Q1-Q4. The input terminals of the inverter correspond to the drain terminals of switches Q1 and Q3 and the source terminals of switches Q2 and Q4. (As noted above, MOSFETs are used as exemplary switching devices, but other switching device types could be used as appropriate for a given application.) The output terminals of the inverter correspond to the connection points of switches Q1 and Q2 (denoted TXac1) and the connection points of switches Q3 and Q4 (denoted TXac2). The inverter output voltage (an AC voltage) appearing across these terminals is denoted Vinv_out. This voltage is applied to the transmitter winding Ltx and tuning capacitor Ctx. Other tuning arrangements and/or configurations may also be used as appropriate for a given embodiment.

The receiver includes an active rectifier made up of switches Q5-Q8. The input terminals of this rectifier, RXac1 and RXac2, corresponding to the connection points of switches Q5/Q6 and Q7/Q8, respectively, receive an input voltage Vrect_in that is induced in the receive coil Lrx by the voltage appearing across transmit coil Ltx by virtue of operation of the inverter. The illustrated receiver side circuitry also includes tuning capacitor Crx, although other tuning arrangements or configurations could be used as appropriate to a given application. The outputs of the rectifier correspond to the drain terminals of switches Q5 and Q7 and the source terminals of switches Q6 and Q8, where the voltage Vrect, ultimately supplied to the load, appears. (As above switching devices other than MOSFETs could be used as appropriate for a given application.

Figure 7:
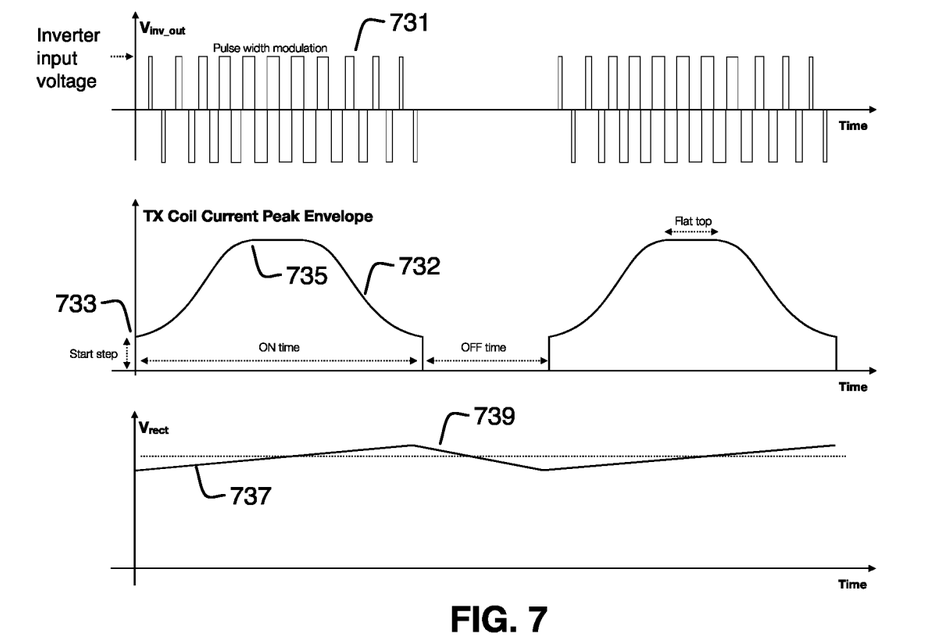
FIG. 7 illustrates a first envelope shaping technique for improving performance.

Returning to the transmitter side, inverter switches Q1-Q4 may be operated by suitable control circuitry, such as PWM control circuitry 108 depicted above in FIG. 1. This PWM circuitry may provide control/gate drive signals to inverter switches Q1-Q4 to generate pulses of varying width that determine the average current delivered to the transmit coil Ltx. FIG. 7 illustrates one exemplary envelope shaping scheme including a first on-time, during which a pulse sequence 731 having varying pulse widths are provided to the inverter switching devices, an off-time during which the inverter switching devices are idle, and a second on-time during which the switches are again operated with varying pulse widths. FIG. 7 depicts a symmetrical PWM switching scheme, in which the inverter-generated positive and negative pulses are symmetrical in width on a cycle-by-cycle basis. Additionally, pulse amplitude may be constant and equal to the inverter input voltage. Positive pulses correspond to turning on switches Q1 and Q4 to apply a positive voltage across transmit winding Ltx, while negative pulses correspond to turning on switches Q2 and Q3 to apply a negative voltage across transmit winding Ltx, resulting in an AC current flowing through the winding.

Pulse sequence 731 begins with relatively narrower pulses, with the applied pulse widths expanding over time, before again decreasing towards the end of the on-time cycle. The result of this pulse width modulation scheme is to produce a burst envelope 732. Burst envelope 732 may be characterized by its on time, start step 733, a flat top 735, and the shape of the curve between the start step and flat top. The start step is the initial current magnitude, which can range from zero to the full current that the inverter is able to supply. Smaller start steps can result in a narrower frequency bandwidth, but may also reduce the power supplied to the transmitter, so a balance may be struck. Flat top 735 corresponds to the peak power level of the transmitter. Similarly to the start step, a balance may be struck between the length of the flat top versus average power delivery rate. Longer flat tops may increase the net power transfer level while also increasing frequency bandwidth, while shorter flat tops may decrease the net power transfer level while also decreasing frequency bandwidth. Finally, the shape of the curve between the start step and the flat top can also influence power transfer level and frequency bandwidth. The curve may be shaped to be linear, sinusoidal, or any other desirable curve shape. As a general principle, a sinusoidal curve shape (as illustrated in FIG. 7, which depicts a cosine curve between start step 733 and flat top 735) will result in a lower frequency bandwidth while a linear shape may increase occupied bandwidth. Using the principles described above, a system can be designed such that the control circuitry generates a pulse sequence 731 that results in the desired shape of burst envelope 732 and a corresponding frequency bandwidth spectrum that complies with an applicable specification or requirement.

The lower portion of FIG. 7 depicts the rectifier voltage Vrect corresponding to the burst mode operation. During the on time (i.e., while switches Q1-Q4 are active), Vrect is increasing, as depicted by rising portion 737. During the off time (i.e., while switches Q1-Q4 are idle), Vrect is decreasing, as depicted by falling portion 739. This ripple in the Vrect voltage is a characteristic of burst mode operation and may be controlled to within desired limits by circuit design (e.g., controlling system capacitance and other parameters) or by circuit operation (e.g., by controlling the on time, off time, and duty cycle).

Figure 8:
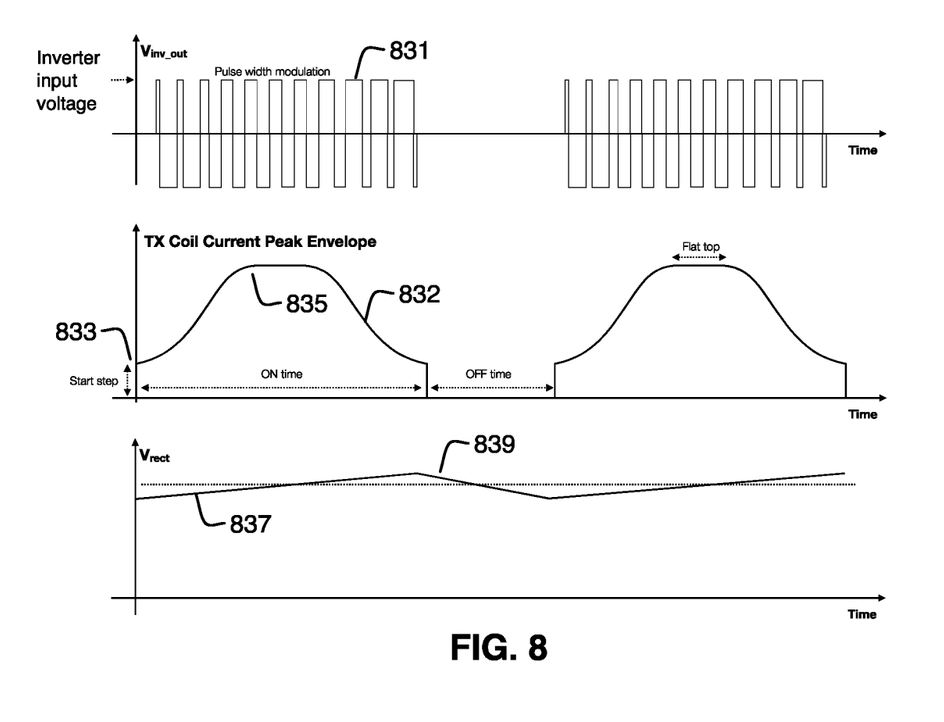
FIG. 8 illustrates a second envelope shaping technique for improving performance.

FIG. 8 illustrates an alternative exemplary envelope shaping scheme including a first on-time, during which a pulse sequence 831 having varying pulse widths are provided to the inverter switching devices, an off-time during which the inverter switching devices are idle, and a second on-time during which the switches are again operated with varying pulse widths. FIG. 8 depicts a complementary PWM switching scheme, in which the inverter-generated positive and negative pulse widths are complementary on a cycle-by-cycle basis. Additionally, pulse amplitude may be constant and equal to the inverter input voltage. Positive pulses correspond to turning on switches Q1 and Q4 to apply a positive voltage across transmit winding Ltx, while negative pulses correspond to turning on switches Q2 and Q3 to apply a negative voltage across transmit winding Ltx, resulting in an AC current flowing through the winding.

Pulse sequence 831 begins with relatively narrower positive pulses, with the applied pulse widths expanding over time. Correspondingly, the negative pulses begin with a broader width decreasing to a narrower width through the on time cycle. The result of this pulse width modulation scheme is to produce a burst envelope 832. As with burst envelope 732 described above, burst envelope 832 may be characterized by its on time, start step 833, a flat top 835, and the shape of the curve between the start step and flat top. Using the principles described above, a system can be designed such that the control circuitry generates a pulse sequence 831 that results in the desired shape of burst envelope 832 and a corresponding bandwidth spectrum.

The lower portion of FIG. 8 depicts the rectifier voltage Vrect corresponding to the burst mode operation. During the on time (i.e., while switches Q1-Q4 are active), Vrect is increasing, as depicted by rising portion 837. During the off time (i.e., while switches Q1-Q4 are idle), Vrect is decreasing, as depicted by falling portion 739. This ripple in the Vrect voltage is a characteristic of burst mode operation and may be controlled to within desired limits by circuit design (e.g., controlling system capacitance and other parameters) or by circuit operation (e.g., by controlling the on time, off time, and duty cycle).

Figure 9:
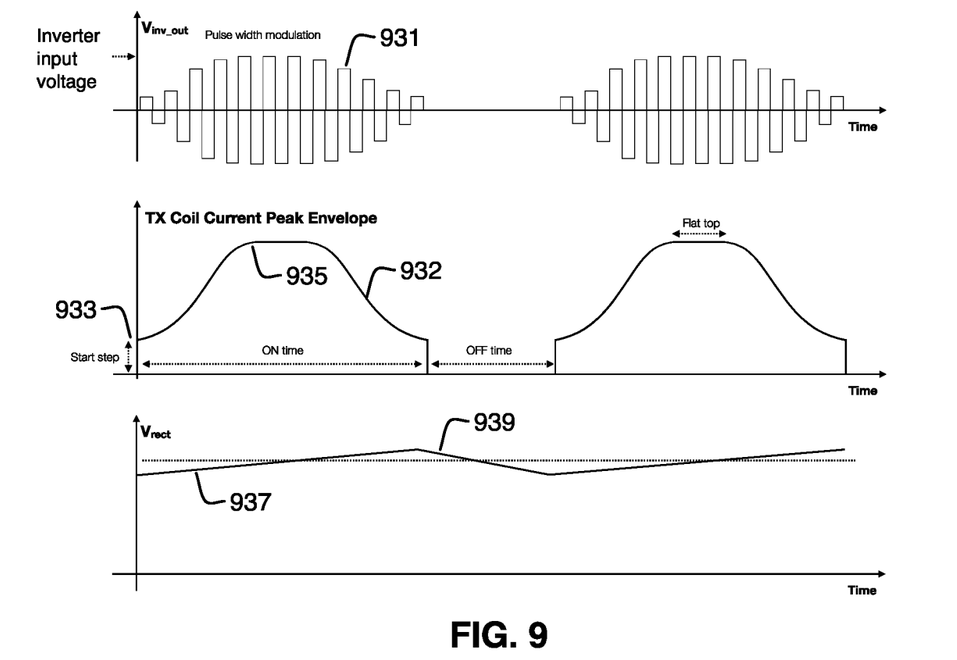
FIG. 9 illustrates a third envelope shaping technique for improving performance.

FIG. 9 illustrates an alternative exemplary envelope shaping scheme including a first on-time, during which a pulse sequence 931 having varying pulse amplitudes are provided to the inverter switching devices, an off-time during which the inverter switching devices are idle, and a second on-time during which the switches are again operated with varying pulse amplitudes. (Pulse widths may optionally also be modulated using this switching scheme.). FIG. 9 depicts an input voltage modulation scheme, in which the inverter-generated positive and negative pulse widths are symmetrical in width and the pulse amplitudes are varied on a cycle-by-cycle basis to produce the desired window shape. Positive pulses correspond to turning on switches Q1 and Q4 to apply a positive voltage across transmit winding Ltx, while negative pulses correspond to turning on switches Q2 and Q3 to apply a negative voltage across transmit winding Ltx, resulting in an AC current flowing through the winding.

Pulse sequence 931 begins with relatively shorter pulse amplitudes, for both positive and negative pulse widths, with the applied pulse amplitudes increasing over time. Although not shown in FIG. 9, pulse widths could also be modulated in addition to the amplitudes. The result of this pulse modulation scheme is to produce a burst envelope 932. As with burst envelopes 732 and 832 described above, burst envelope 932 may be characterized by its on time, start step 933, a flat top 835, and the shape of the curve between the start step and flat top. Using the principles described above, a system can be designed such that the control circuitry generates a pulse sequence 931 that results in the desired shape of burst envelope 932 and frequency bandwidth spectrum.

Pulse amplitude may be varied in different ways. In some embodiments, a voltage pre-regulator may be inserted upstream of the inverter power rails, and the voltage pre-regulator may be controlled to produce a rail voltage input to the inverter that corresponds to the desired pulse amplitude. This voltage pre-regulator could be a switching converter, such as a buck converter, or could be a form of linear regulator. However, a switching converter would typically be more efficient in such configurations.

The lower portion of FIG. 9 depicts the rectifier voltage Vrect corresponding to the burst mode operation. During the on time (i.e., while switches Q1-Q4 are active), Vrect is increasing, as depicted by rising portion 937. During the off time (i.e., while switches Q1-Q4 are idle), Vrect is decreasing, as depicted by falling portion 939. This ripple in the Vrect voltage is a characteristic of burst mode operation and may be controlled to within desired limits by circuit design (e.g., controlling system capacitance and other parameters) or by circuit operation (e.g., by controlling the on time, off time, and duty cycle).

The foregoing example inverter pulse modulation techniques allow shaping of the current window applied by the inverter to the transmit coil during the on time of burst mode operation. The particular window shape can be selected from among a variety of window shapes, including square, trapezoidal, sinusoidal, Gaussian, sinc (i.e., sin(x)/x), Tukey, Kaiser, Hamming, Hann, DPSS, and other suitable window shapes known to those familiar with the signal processing arts. As discussed above window shapes having more gradual transitions (e.g., sinusoidal, Hamming windows) may result in better performance with shorter minimum on times as opposed to window shapes having sharper transitions (e.g., square, trapezoidal, or Kaiser windows). Nonetheless, any suitable window shape may be employed for a given system as appropriate to meet design requirements.

The foregoing describes exemplary embodiments of wireless power transfer transmitters, receivers, and systems using burst mode based communications in which burst envelope shaping is employed. Such systems may be used in a variety of applications but may be particularly advantageous when used in conjunction with wireless power transfer systems personal electronic devices such as a mobile phones, smart watches, and/or tablet computers including accessories for such devices such as wireless earphones, styluses, and the like. However, any wireless power transfer system for which increased overall efficiency is desired may advantageously employ the techniques described herein. Although numerous specific features and various embodiments have been described, it is to be understood that, unless otherwise noted as being mutually exclusive, the various features and embodiments may be combined in various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A wireless power transmitter comprising:
a wireless power transfer coil;
an inverter coupled to the wireless power transfer coil; and
control circuitry coupled to the inverter that, responsive to receiving a burst request pulse from a wireless power receiver, initiates operation of the inverter to drive the wireless power transfer coil, thereby delivering power to the wireless power receiver; and
wherein the control circuitry operates one or more switching devices of the inverter to deliver power to the wireless power receiver such that a bandwidth of the wireless power transfer signal falls within a specified bandwidth range by modifying drive signals supplied to the switching devices to shape a coil current burst envelope.

2. The wireless power transmitter of claim 1 wherein the control circuitry modifies the drive signals supplied to the switching devices to shape the coil current burst envelope using a symmetrical pulse width modulation switching scheme in which the inverter-generated positive and negative pulses are symmetrical in width on a cycle-by-cycle basis.

3. The wireless power transmitter of claim 1 wherein the control circuitry modifies drive signals supplied to the switching devices to shape the coil current burst envelope using a complementary pulse width modulation switching scheme in which the inverter-generated positive and negative pulse widths are complementary on a cycle-by-cycle basis.

4. A wireless power transmitter comprising:
a wireless power transfer coil;
an inverter coupled to the wireless power transfer coil; and
control circuitry coupled to the inverter that, responsive to receiving a burst request pulse from a wireless power receiver, initiates operation of the inverter to drive the wireless power transfer coil, thereby delivering power to the wireless power receiver; and
wherein the control circuitry operates one or more switching devices of the inverter to deliver power to the wireless power receiver such that a bandwidth of the wireless power transfer signal falls within a specified bandwidth range by modifying an amplitude of pulse width modulation signals supplied to the switching devices.

5. A method of operating a wireless power transmitter in a burst mode, the method comprising:
receiving a burst request pulse from a wireless power receiver;
responsive to the burst request pulse, operating one or more switching devices of the transmitter during an on time; and
subsequent to the on time, idling the one or more switching devices during an off time;
wherein operating one or more switching devices of the transmitter during an on time comprises operating the one or more switching devices to constrain electromagnetic emissions from the wireless power transmitter within a specified bandwidth range by modifying drive signals supplied to the switching devices to shape a coil current burst envelope.

6. The method of claim 5 wherein modifying the drive signals supplied to the switching devices to shape the coil current burst envelope comprises using a symmetrical pulse width modulation switching scheme in which the inverter-generated positive and negative pulses are symmetrical in width on a cycle-by-cycle basis.

7. The method of claim 5 wherein modifying the drive signals supplied to the switching devices to shape the coil current burst envelope comprises using a complementary pulse width modulation switching scheme in which the inverter-generated positive and negative pulse widths are complementary on a cycle-by-cycle basis.

8. A method of operating a wireless power transmitter in a burst mode, the method comprising:
- receiving a burst request pulse from a wireless power receiver;
- responsive to the burst request pulse, operating one or more switching devices of the transmitter during an on time; and
- subsequent to the on time, idling the one or more switching devices during an off time;
- wherein operating one or more switching devices of the transmitter during an on time comprises operating the one or more switching devices to constrain electromagnetic emissions from the wireless power transmitter within a specified bandwidth range by modifying the drive signals supplied to the switching devices to shape a coil current burst envelope by modifying an amplitude of pulse width modulation signals supplied to the switching devices.

9. A wireless power transmitter comprising:
- a wireless power transfer coil;
- an inverter comprising a plurality of switching devices coupled to the wireless power transfer coil; and
- control circuitry that provides drive signals to the plurality of switching devices, the drive signals being controlled such that a frequency bandwidth of the wireless power transfer signal falls within a predetermined range,
- wherein the control circuitry employs a symmetrical pulse width modulation scheme to shape a burst current envelope such that the frequency bandwidth of the wireless power transfer signal falls within the predetermined range.

10. The wireless power transmitter of claim 9 wherein the symmetrical pulse width modulation scheme includes generating positive and negative pulses that are symmetrical in width on a cycle-by-cycle basis.

11. A wireless power transmitter comprising:
- a wireless power transfer coil;
- an inverter comprising a plurality of switching devices coupled to the wireless power transfer coil; and
- control circuitry that provides drive signals to the plurality of switching devices, the drive signals being controlled such that a frequency bandwidth of the wireless power transfer signal falls within a predetermined range;
- wherein the control circuitry employs a complementary pulse width modulation scheme to shape a burst current envelope such that the frequency bandwidth of the wireless power transfer signal falls within the predetermined range.

12. The wireless power transmitter of claim 11 wherein the complementary pulse width modulation scheme includes generating positive and negative pulses having complementary widths on a cycle-by-cycle basis.

13. A wireless power transmitter comprising:
- a wireless power transfer coil;
- an inverter comprising a plurality of switching devices coupled to the wireless power transfer coil; and
- control circuitry that provides drive signals to the plurality of switching devices, the drive signal being controlled such that the frequency bandwidth of the wireless power transfer signal falls within a predetermined range;
- wherein the control circuitry employs an amplitude modulation scheme to shape a burst current envelope such that a frequency bandwidth of the wireless power transfer signal falls within the predetermined range.

* * * * *

UNITED STATES PATENT AND TRADEMARK OFFICE
CERTIFICATE OF CORRECTION

PATENT NO. : 11,677,255 B1
APPLICATION NO. : 17/644005
DATED : June 13, 2023
INVENTOR(S) : Ye Li et al.

Page 1 of 1

It is certified that error appears in the above-identified patent and that said Letters Patent is hereby corrected as shown below:

In the Claims

Column 12, Claim 13, Line 26, please replace "signal" with --signals--.

Signed and Sealed this
Thirtieth Day of April, 2024

*Katherine Kelly Vidal*

Katherine Kelly Vidal
*Director of the United States Patent and Trademark Office*